(12) United States Patent
Luan et al.

(10) Patent No.: US 10,254,729 B2
(45) Date of Patent: Apr. 9, 2019

(54) DATA-DIFFERENCE-DRIVEN SELF-LEARNING DYNAMIC OPTIMIZATION METHOD FOR BATCH PROCESS

(71) Applicant: Jiangnan University, Wuxi (CN)

(72) Inventors: Xiaoli Luan, Wuxi (CN); Zhiguo Wang, Wuxi (CN); Fei Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 15/566,902

(22) PCT Filed: Dec. 4, 2015

(86) PCT No.: PCT/CN2015/096377
§ 371 (c)(1),
(2) Date: Oct. 16, 2017

(87) PCT Pub. No.: WO2017/088208
PCT Pub. Date: Jun. 1, 2017

(65) Prior Publication Data
US 2018/0259921 A1    Sep. 13, 2018

(30) Foreign Application Priority Data

Nov. 26, 2015  (CN) .......................... 2015 1 0834482

(51) Int. Cl.
*G05B 19/042* (2006.01)
*G05B 13/02* (2006.01)
*G06N 99/00* (2019.01)

(52) U.S. Cl.
CPC ........... *G05B 19/042* (2013.01); *G05B 13/02* (2013.01); *G06N 99/005* (2013.01); *G05B 2219/32077* (2013.01)

(58) Field of Classification Search
CPC ........ G06F 17/50; G05B 13/04; G06Q 10/04; G01N 30/8675; G01N 30/72; G01N 30/78;
(Continued)

(56) References Cited

U.S. PATENT DOCUMENTS

| 7,949,475 B2 * | 5/2011 | Barrett, Jr. ............ G06F 19/703 702/22 |
| 2004/0143461 A1 * | 7/2004 | Watkins .................. G06F 19/28 705/2 |

(Continued)

FOREIGN PATENT DOCUMENTS

| CN | 101872444 A | 10/2010 |
| CN | 103092078 A | 5/2013 |

*Primary Examiner* — Shogo Sasaki
(74) *Attorney, Agent, or Firm* — Na Xu; IPro, PLLC (57) ABSTRACT

The present invention discloses a data difference-driven self-learning dynamic batch process optimization method including the following steps: collect production process data off line; eliminate singular batches through PCA operation; construct time interval and index variance matrices to carry out PLS operation to generate initial optimization strategies; collect data of new batches; run a recursive algorithm; and update the optimization strategy. The present invention utilizes a perturbation method to establish initial optimization strategies for an optimized variable setting curve. On this basis, self-learning iterative updating is carried out for mean values and standard differences on the basis of differences in data statistics, so that the continuous improvement of optimized indexes is realized, and thereby a new method is provided for batch process optimization strategies for solving actual industrial problems. The present invention is fully based on operational data of a production process, and does not need priori knowledge about a process mechanism and a mechanism model. The present invention is applicable to the dynamic optimization of operation (Continued)

trajectories of batch reactors, batch rectifying towers, batch drying, batch fermentation, batch crystallization and other processes and systems adopting batch operation.

5 Claims, 6 Drawing Sheets

(58) Field of Classification Search
CPC .......... G01N 30/8631; G01N 30/8662; G01N 30/8682
See application file for complete search history.

(56) References Cited

U.S. PATENT DOCUMENTS

| | | | |
|---|---|---|---|
| 2005/0209789 A1* | 9/2005 | Hastings | G01N 30/8624 702/22 |
| 2005/0288872 A1* | 12/2005 | Old | G01N 30/72 702/30 |
| 2006/0151688 A1 | 7/2006 | Castro-Perez et al. | |

* cited by examiner

DATA-DIFFERENCE-DRIVEN SELF-LEARNING DYNAMIC OPTIMIZATION METHOD FOR BATCH PROCESS

FIELD OF THE INVENTION

The present invention belongs to the field of the chemical process manufacturing industry, and relates to a data-difference-driven self-learning dynamic optimization method for batch process. The method is applicable to the dynamic optimization of operation trajectories of batch reactors, batch rectifying towers, batch drying, batch fermentation, batch crystallization and other processes and systems adopting batch operation.

BACKGROUND OF THE INVENTION

Batch processes have been widely applied in the production and preparation of a variety of products, such as food, polymers and medicines, and play an important role in chemical production and process industries. With the continuous development of computer technology, process control and optimization technology, the quality control and optimization of batch processes have become one of the hot spots studied by the contemporary industrial circle and academic circle, and have great significance for the development of the batch process industries.

At present, a mechanism model-based optimization method is adopted for the quality control and optimization issues of most of the batch processes. It has high optimization efficiency, and can be used for on-line control and optimization, but it must depend on a complex process model to proceed. The flexibility of the batch processes determines that product processing may change at any time, and the batch processes lack conditions for a lot of experiments and a great deal of time required by model identification. Moreover, the nonlinearity, uncertainty and interference of the batch processes are severer than those of continuous processes, bringing a lot of problems to the establishment of accurate and reliable mechanism models for the batch processes.

A data drive-based optimization method does not need priori knowledge about a process, and has obvious advantages. Nevertheless, when operation optimization is carried out for a batch production process, if optimization is carried out only once, the optimization performance is limited. Therefore, how to utilize the repetitive characteristic of a batch process to continuously improve quality indexes and increase production efficiency according to information of historical batches by updating the trajectory of an optimization variable of the current batch by means of an iterative algorithm has become a difficulty to be solved and a focus in the field of batch process optimization.

SUMMARY OF THE INVENTION

The present invention relates to a data difference-driven model-less self-learning dynamic optimization method for batch processes, which utilizes a perturbation method to establish initial optimization strategies for an optimized variable setting curve.

In order to achieve the above-mentioned objective, the present invention adopts the following technical solution: the data difference-driven model-less self-learning dynamic optimization method for batch processes is fully based on operational data of a production process, and does not need priori knowledge about a process mechanism and a mechanism model.

The method includes two parts. The first part is collection of initial data and establishment of initial optimization strategies. The second part is a step of establishment of self-learning algorithm based on data of new batches and calculation.

The step of collection of initial data and establishment of initial optimization strategies is as follows:

Step 1: For a batch process complete in operation, collect a to-be-optimized variable and final qualities or yield indexes according to batches. Time intervals of data collection can be equal time intervals or unequal time intervals, and within a time interval, a to-be-optimized variable of the process does not change significantly, or its change won't significantly influence final quality or yield indexes. Normally, 20 to 30 sets of effective data are required.

Step 2: For the collected data, carry out principal component analysis on variables according to the batches and eliminate singular points in a principal component pattern graph, so that all the data points are within a degree of credibility.

Step 3: Partition the operational data into N time intervals at equal or unequal intervals on a time axis after the singular points are eliminated.

Step 4: Express the data of each batch included in each time interval as a continuous variable $C_i$ (i=1, 2, ... N), and these variables are called decomposed time interval variables. The value of each time interval variable is composed of the data of each batch of the to-be-optimized variable within a specific time interval. A data matrix composed of multiple batches of time interval variables is called a time interval variable matrix, denoted by $L_{p \times N}$, and P is a batch number.

Step 5: Call the quality or yield index of each batch corresponding to step 4 as an index variable $Y_{p \times 1}$. The values of the index variables are the continuous variables generated by final qualities or yields of p batches.

Step 6: According to the time interval variable matrix $L_{p \times N}$ and the index variables $Y_{p \times 1}$ generated in step 4 and step 5, respectively calculate a covariance matrix $S_{LL}$ and a pooled covariance matrix $S_{LY}$.

Step 7: Carry out principal component analysis on the covariance matrix $S_{LL}$ and the pooled covariance matrix $S_{LY}$ to obtain a PLS coefficient vector $F_i$ (i=1, 2, ... N).

Step 8: Classify the PLS coefficient variable elements in step 7 according to symbol magnitudes, and define the functional symbols as follows:

$$\text{sign}(i) = \begin{cases} +1 & \text{if } F_i \geq e \\ 0 & \text{if } |F_i| < e \\ -1 & \text{if } F_i \leq -e \end{cases}, i = 1, 2, \ldots N$$

wherein e is a threshold limit for noise, and sign(i) is a PLS coefficient symbol corresponding to the $i^{th}$ time interval.

Step 9: Calculate a mean value and a standard difference of every time interval variable. Establish an optimization strategy for each time interval variable of the collected data of the batches according to the following perturbation magnitude calculation formula:

$$J_i = M_i + \text{sign}_i \times 3\sigma_i$$

$J_i$, $M_i$ and $\sigma_i$ here are the optimized target value, mean value and standard difference of the $i^{th}$ time interval variable.

Step 10: Combine the optimized target values of all the time intervals obtained in step 9 into a new optimized variable curve for the whole batch process according to a time interval sequence i=1, 2, . . . N.

After being established, the above-mentioned initial optimization strategies will serve as initial values for a self-learning algorithm. The step of establishment of self-learning algorithm based on data of new batches and calculation is as follows:

Step 11: Collect time interval variables $C_i(k+1)$ (i=1, 2, . . . N) and index variable data $Y(k+1)$ of new batches, and utilize the following recursive formulas to calculate and update the covariance matrix $S_{LL}(k+1)$ and the pooled covariance matrix $S_{LY}(k+1)$:

$$S_{LL}(k+1)=\lambda S_{LL}(k)+C(k+1)^T C(k+1)$$

$$S_{LY}(k+1)=\lambda S_{LY}(k)+C(k+1)^T Y(k+1)$$

wherein $C(k+1)=[C_1(k+1), C_2(k+1) \ldots C_N(k+1)]$, $0<\lambda<1$ is a forgetting factor for the existing covariance matrix. when $\lambda$ is equal to 1, it represents that no data are eliminated from the old covariance matrix.

Step 12: Carry out principal component analysis on the covariance matrix $S_{LL}(k+1)$ and the pooled covariance matrix $S_{LY}(k+1)$ to obtain a PLS coefficient vector (k+1).

Step 13: Utilize the following recursive formulas to calculate a mean value and a standard difference of every time interval variable under the data of the new batches:

$$M_i(k+1)=M_i(k)+[C_i(k+1)-M_i(k)]/(k+1)$$

$$\sigma_i(k+1)=\sigma_i(k)+[C_i(k+1)-M_i(k)]\times[C_i(k+1)-M_i(k+1)]$$

Step 14: According to the perturbation magnitude calculation formula in step 9, calculate an optimized target value of each time interval variable under the data of the new batches.

Step 15: Combine the optimized target values of all the time intervals obtained in step 14 into a new optimized variable curve according to a time interval sequence i=1, 2, . . . N.

Judge whether there is new data to be updated. If there are new data, go to step 11 to continue with self-learning updating operation. Otherwise, end the learning process.

Normally, digital filtering needs to be carried out on the optimized variable curve established in above-mentioned step 15, so that a new optimized curve is smooth and easy to track and control.

The present invention utilizes a perturbation method to establish initial optimization strategies for an optimized variable setting curve. On this basis, self-learning iterative updating is carried out for mean values and standard differences on the basis of differences in data statistics, so that the continuous improvement of optimized indexes is realized, and thereby a new method is provided for solving actual industrial problem, batch process optimization strategies. The present invention is fully based on operational data of a production process, and does not need priori knowledge about a process mechanism and a mechanism model.

DETAILED DESCRIPTION OF THE INVENTION

The present embodiment takes a batch crystallization process as an example, and the method does not limit the scope of the present invention.

The method is divided into three parts. The first part is collection and preprocessing of data. The second part is calculation of initial optimization strategy. The third part is calculation of recursive optimization strategies on basis of obtaining updated batch data.

Figure 1:
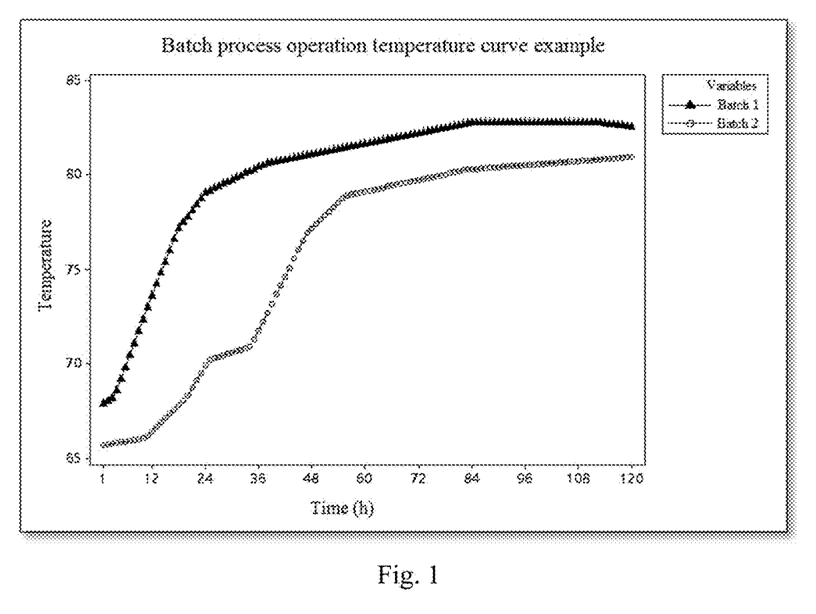
FIG. 1 is a temperature operation curve graph of a batch process.
Figure 6:
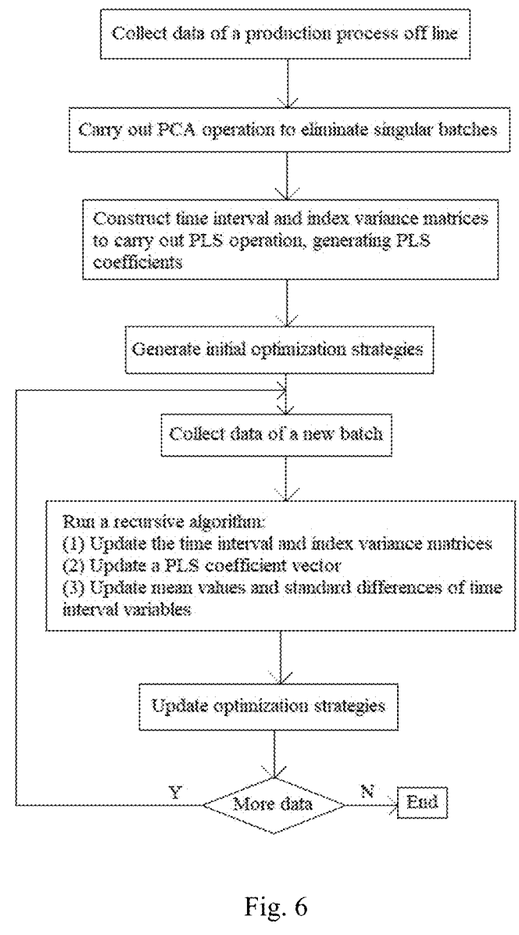
FIG. 6 is a block diagram of a recursive calculation process of the present invention.

The block diagram of the implementation steps of the method is shown in FIG. 6, and the specific implementation steps and algorithms are as follows:

Step 1: For the batch crystallization process complete in operation, choose a temperature operation curve closely relates to product yield as a to-be-optimized variable, and collect 35 sets of temperature variables and final yield index data according to batches. The time interval of data collection is 1 minute. FIG. 1 is a temperature curve example (partial) of a batch crystallization process.

Figure 2:
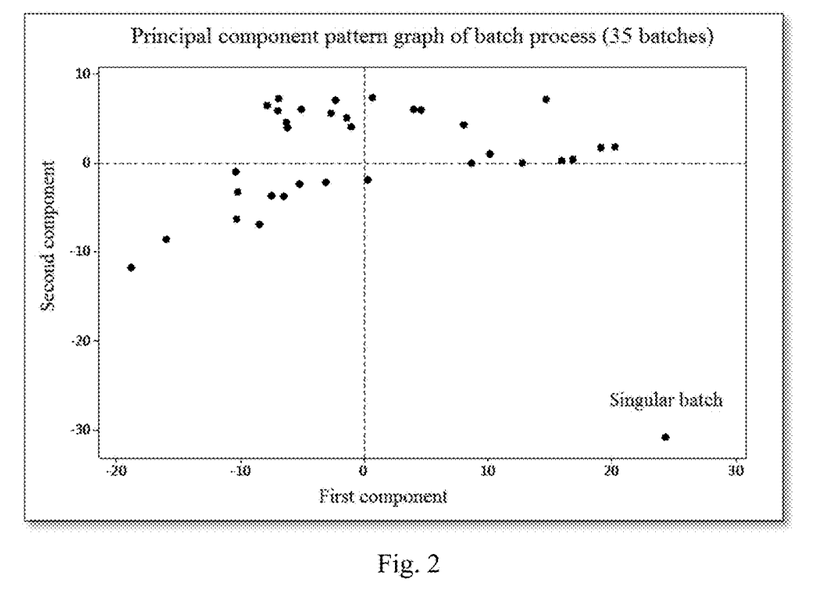
FIG. 2 is a principal component pattern graph with batch process temperature as an optimized variable.

Step 2: For the collected temperature data of all the batches, carry out principal component analysis on the temperature variables according to batches and eliminate singular points in a principal component pattern graph, so that all the data points are within a degree of credibility. FIG. 2 is a principal component pattern graph with a batch process and temperature as optimized variables, it can be seen from the drawing that the pattern of one batch at the lower right corner is at great distances from all the other points, and the data of this batch should be eliminated.

Figure 3:
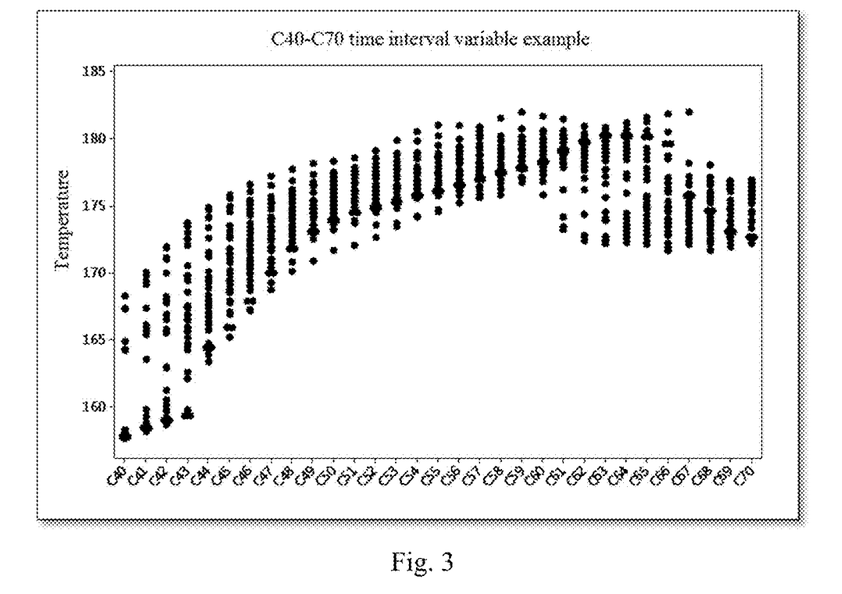
FIG. 3 is an exemplary graph of time interval variables.

Step 3: Divide the temperature data of the remaining 34 batches into 221 time intervals at equal intervals on a time axis, generating time interval variables $C_1, C_2 \ldots C_{221}$. For clarity, FIG. 3 gives time interval variables from $C_{40}$ to C70.

Step 4: Use the time interval variables of multiple batches to construct a time interval variable matrix $L_{34\times221}$ and index variables $Y_{34\times1}$.

Figure 4:
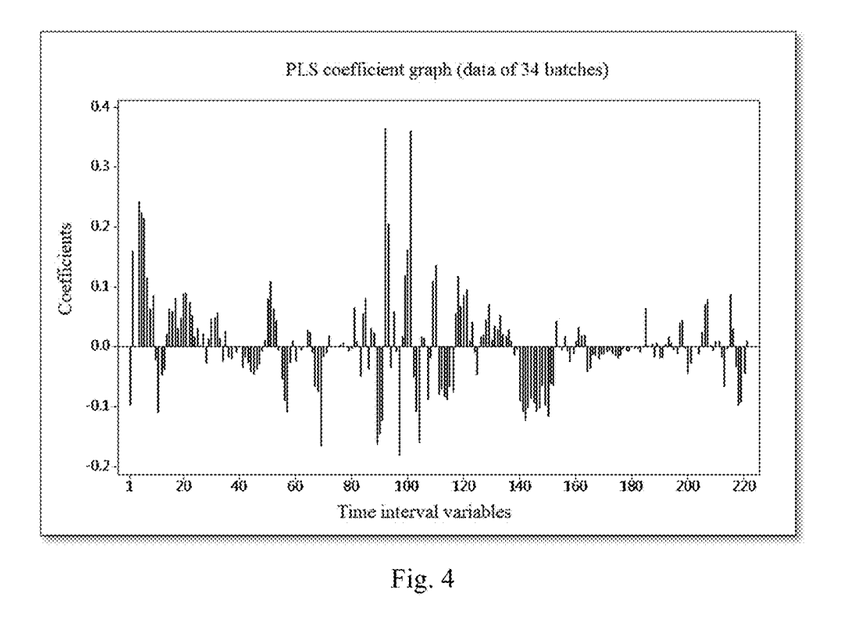
FIG. 4 is an exemplary PLS coefficient graph of the time interval variables.

Step 5: According to the time interval variable matrix L and the index variables Y generated in step 4, respectively calculate a covariance matrix $S_{LL}$ and a pooled covariance matrix $S_{LY}$;

Step 6: Carry out principal component analysis on the covariance matrix $S_{LL}$ and the pooled covariance matrix $S_{LY}$ to obtain a PLS coefficient vector $F_{221}$. FIG. 4 is a PLS coefficient graph with 221 time interval variables.

Step 7: For the PLS coefficient variable elements in step 6, define the following functional symbols:

$$\text{sign}(i) = \begin{cases} +1 & \text{if } F_i \geq e \\ 0 & \text{if } |F_i| < e \\ -1 & \text{if } F_i \leq -e \end{cases}, i = 1, 2, \ldots N$$

wherein e is a threshold limit for noise, and e here is equal to 0.01.

Step 8: Calculate a mean value and a standard difference of every time interval variable, and calculate an optimized target value of each time interval variable of the collected data of the batches according to the following perturbation magnitude calculation formula:

$$J_i = M_i + \text{sign}_i \times 3\sigma_i$$

$J_i$, $M_i$ and $\sigma_i$ here are the optimized target value, mean value and standard difference of the ith time interval variable.

Figure 5:
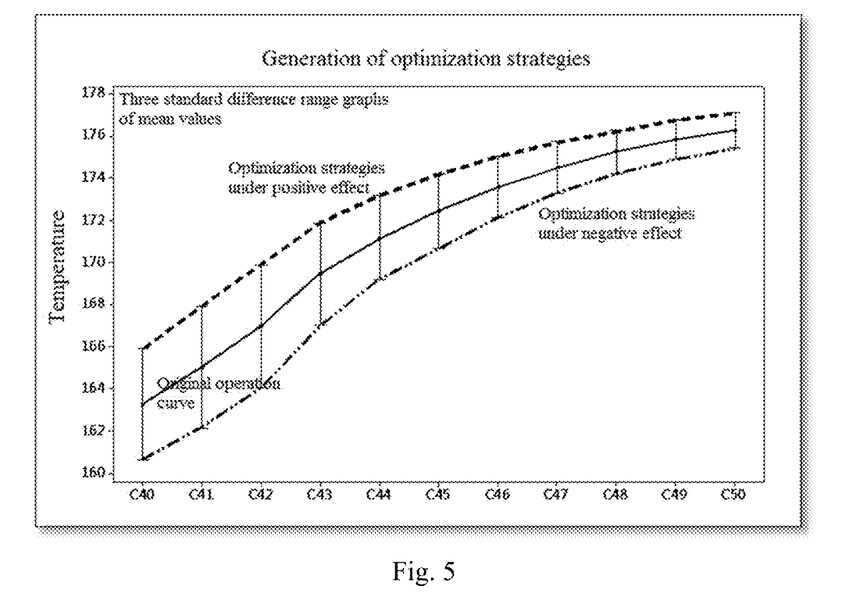
FIG. 5 is a calculation graph of an optimized target variable curve.

Step 9: Combine the optimized target values of all the time intervals obtained in step 8 into an optimized variable curve according to a time interval sequence i=1, 2, . . . 221. FIG. 5 is an example of establishing an optimized target variable curve. As shown in FIG. 5, when i is equal to 40, the mean value $M_{40}$ is equal to 159.687, the standard difference 640 is equal to 0.577, $F_{40}$ is equal to 0.000149, $\text{sign}_{40}$ is equal to 0, and the obtained optimization strategy is $J_{40}=159.687$; when i is equal to 45, the mean value $M_{45}$ is equal to 170.26, the standard difference 645 is equal to 0.416, $F_{45}$ is equal to −0.046091, $\text{sign}_{45}$ is equal to −1, and the obtained optimization strategy is $J_{45}=169.020$.

The optimization strategies established for the data of the above-mentioned batches are adopted as initial values for the recursive learning of data of new batches.

The step of establishment of recursive self-learning algorithm based on data of new batches and calculation is as follows:

Step 10: Collect a time interval variable $C_i(k+1)$ (i=1, 2, . . . N) and index variable data $Y(k+1)$ of data of a new batch, and k here is equal to 35.

Utilize the following recursive self-learning formulas to update the covariance matrix $S_{LL}(k+1)$ and the pooled covariance matrix $S_{LY}(k+1)$:

$$S_{LL}(k+1) = \lambda S_{LL}(k) + C(k+1)^T C(k+1)$$

$$S_{LY}(k+1) = \lambda S_{LY}(k) + C(k+1)^T Y(k+1)$$

wherein k=35, 36, . . . , $C(k+1)=[C_1(k+1), C_2(k+1) \ldots C_N(k+1)]$, and $0<\lambda<1$ is a forgetting factor for the existing covariance matrix. When $\lambda$ is equal to 1, it represents that no data are eliminated from the old covariance matrix. In the present embodiment, in order to keep the information of all the batches, $\lambda$ is equal to 1.

Step 11: Carry out principal component analysis on the covariance matrix $S_{LL}(k+1)$ and the pooled covariance matrix $S_{LY}(k+1)$ to obtain a PLS coefficient vector $F_i(k+1)$.

Step 12: Utilize the following recursive self-learning formulas to calculate a mean value and standard difference of every time interval variable under the data of the new batches:

$$M_i(k+1) = M_i(k) + [C_i(k+1) - M_i(k)]/(k+1)$$

$$\sigma_i(k+1) = \sigma_i(k) + [C_i(k+1) - M_i(k)] \times [C_i(k+1) - M_i(k+1)]$$

In the present embodiment, when i is equal to 40, the mean value $M_{40}(35)$ of the data of the original 35 batches is equal to 159.687, and the standard difference $\sigma_{40}(35)$ is equal to 0.577; after the data of the new batch are updated, the mean value $M_{40}(36)$ is equal to 159.772, and the standard difference $\sigma_{40}(36)$ is equal to 0.585; when i is equal to 45, the mean value $M_{45}(35)$ of the data of the original 35 batches is equal to 170.26, and the standard difference $\sigma_{45}(35)$ is equal to 0.416; after the data of the new batch are updated, the mean value $M_{45}(36)$ is equal to 170.336, and the standard difference $\sigma_{45}(36)$ is equal to 0.510.

Step 13: According to the mean values and standard differences of the updated time interval variables obtained by calculation in the above-mentioned step, obtain an optimized target value of each time interval variable according to the perturbation magnitude calculation formula in step 8. If i is equal to 40, the mean value $M_{40}$ is equal to 159.772, the standard difference $\sigma_{40}$ is equal to 0.585, $F_{40}$ is equal to −0.008856, and the obtained optimization strategy is $J_{40}=159.772$; when i is equal to 45, the mean value $M_{45}$ is equal to 170.336, the standard difference $\sigma_{45}$ is equal to 0.510, $F_{40}$ is equal to −0.04199, and the obtained optimization strategy is $J_{45}=168.832$.

Step 14: Combine the optimized target values of all the time intervals obtained in step 13 into an updated optimized variable curve according to the time interval sequence i=1, 2, . . . 221.

Judge whether there is new data to be updated. If there are new data, go to step 10 to carry out self-learning recursive operation, or else end the calculation process. In the present embodiment, there are new data of 15 batches, and after the recursive algorithm is continuously calculated 15 times, that is, k is equal to 49, recursive calculation is ended.

Figure 7:
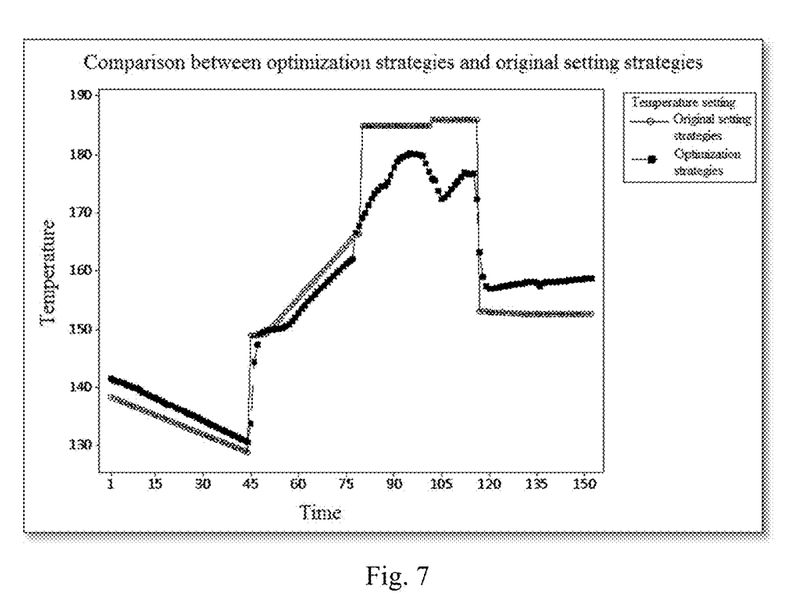
FIG. 7 is a comparison graph of an optimized temperature curve and an original temperature curve.
Figure 8:
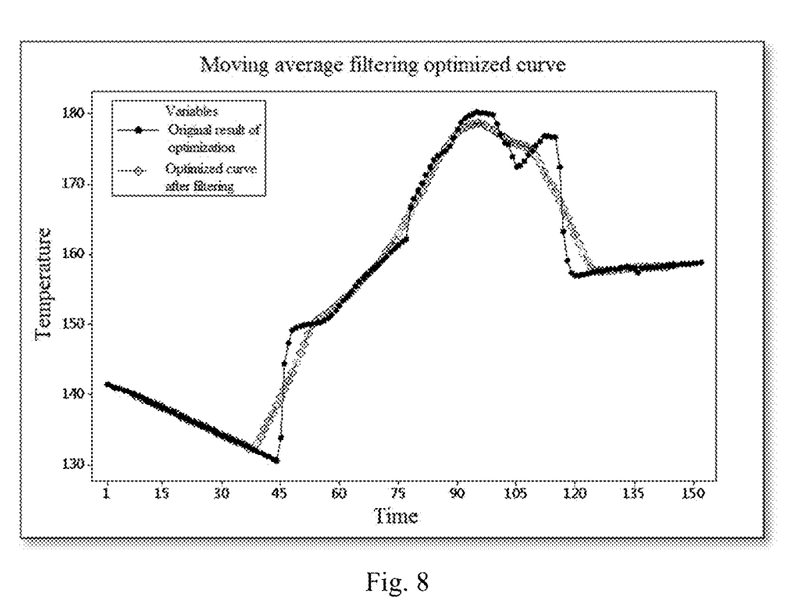
FIG. 8 is an optimized curve graph before and after filtering.

Normally, digital filtering needs to be carried out on the optimized variable curve established in above-mentioned step 14, so that a new optimized curve is smooth and easy to track and control. FIG. 7 is the comparison between an optimized curve and an original curve. FIG. 8 is an example of optimized curves before and after moving average filtering.

Figure 9:
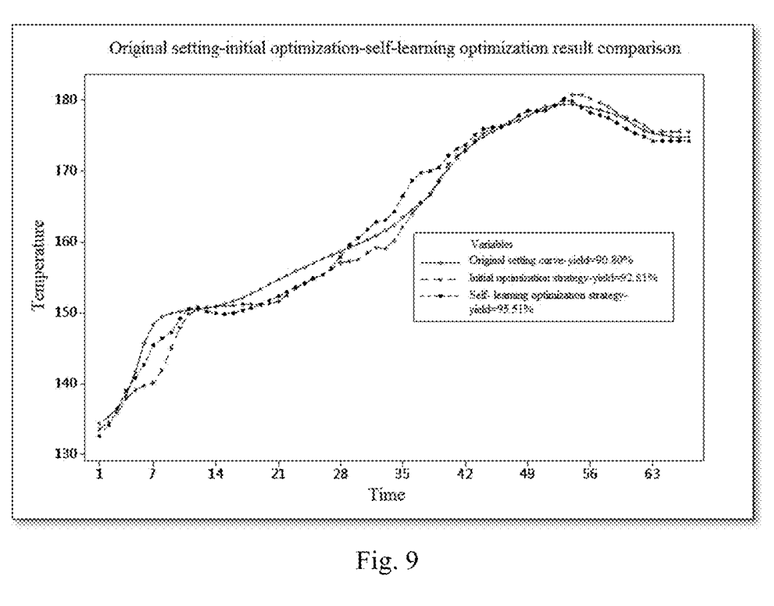
FIG. 9 is a result comparison graph of a self-learning optimization strategy and an initial optimization strategy and an original operation.

In order to illustrate the effectiveness of the method of the present invention, FIG. 9 is an optimization result example of a batch crystallization process. The production data of the 35 batches serve as driving data for initial optimization, and the data of the 15 batches serve as recursively updated data. Yield is increased from 90.80% before the application of optimization strategies to 92.81% after the application of the initial optimization strategies, and finally, by the self-learning optimization strategies, yield is increased to 95.51%.

The invention claimed is:

1. A data difference-driven self-learning dynamic batch process optimization method comprising:
   (1) for a batch process complete in operation, collecting a to-be-optimized variable and final quality or yield indexes from a batch reactor, according to batches;
   (2) for the data collected in step (1), carrying out principal component analysis with the batches as variables and eliminating singular points in a principal component pattern graph, so that all the data points are within a degree of credibility;
   (3) partitioning the operational data into N time intervals at intervals on a time axis after the singular points are eliminated; expressing the data of each batch included in each time interval as a continuous variable $C_i$ (i=1, 2, . . . N), wherein these variables are time interval variables; wherein the value of each time interval variable is composed of the data of each batch of the to-be-optimized variable within a specific time interval; wherein a data matrix composed of multiple batches of time interval variables is a time interval variable matrix, denoted by $L_{P \times N}$, and P is a batch number;

(4) defining the quality or yield index of each batch corresponding to step (3) as an index variable $Y_{px1}$, and the values of index variables to be continuous variables generated by final qualities or yields of p batches;

(5) according to the time interval variable matrix $L_{p \times N}$ and the index variables $Y_{px1}$ generated in step (3) and step (4), respectively calculating a covariance matrix $S_{LL}$ and a pooled covariance matrix $S_{LY}$;

(6) carrying out principal component analysis on the covariance matrix $S_{LL}$ and the pooled covariance matrix $S_{LY}$ to obtain a PLS coefficient vector $F_i$ (i=1, 2, ... N);

(7) classifying the PLS coefficient variable elements in step (6) according to symbol magnitudes, and defining the functional symbols as follows:

$$\text{sign}(i) = \begin{cases} +1 & \text{if } F_i \geq e \\ 0 & \text{if } |F_i| < e \\ -1 & \text{if } F_i \leq -e \end{cases}, i = 1, 2, \ldots N$$

wherein e is a threshold limit for noise, and sign(i) is a PLS coefficient symbol corresponding to the $i^{th}$ time interval;

(8) calculating a mean value and a standard difference of every time interval variable; and establishing an initial optimization strategy for each time interval variable of the collected data of the batches according to the following perturbation magnitude calculation formula:

$$J_i = M_i + \text{sign}_i \times 3\sigma_i$$

$J_i$, $M_i$ and $\sigma_i$ here are the optimized target value, mean value and standard difference of the ith time interval variable;

(9) combining the optimized target values of all the time intervals obtained in step (8) into an initial optimized variable curve for the whole batch process according to a time interval sequence i=1, 2, ... N;

(10) collecting time interval variables $C_i(k+1)$ (i=1, 2, ... N) and index variable data $Y(k+1)$ of new batches, and utilizing the following recursive formulas to calculate and update the covariance matrix $S_{LL}(k+1)$ and the pooled covariance matrix $S_{LY}(k+1)$:

$$S_{LL}(k+1) = \lambda S_{LL}(k) + C(k+1)^T C(k+1)$$

$$S_{LY}(k+1) = \lambda S_{LY}(k) + C(k+1)^T Y(k+1)$$

wherein $C(k+1) = [C_1(k+1), C_2(k+1) \ldots C_N(k+1)]$, $0 < \lambda < 1$ is a forgetting factor for the existing covariance matrix; and when $\lambda$ is equal to 1, it represents that no data are eliminated from the old covariance matrix;

(11) carrying out principal component analysis on the covariance matrix $S_{LL}(k+1)$ and the pooled covariance matrix $S_{LY}(k+1)$ to obtain a PLS coefficient vector (k+1);

(12) utilizing the following recursive formulas to calculate a mean value and a standard difference of every time interval variable under the data of the new batches:

$$M_i(k+1) = M_i(k) + [C_i(k+1) - M_i(k)]/(k+1)$$

$$\sigma_i(k+1) = \sigma_i(k) + [C_i(k+1) - M_i(k)] \times [C_i(k+1) - M_i(k+1)];$$

(13) according to the perturbation magnitude calculation formula in step (8), calculating an optimized target value of each time interval variable under the data of the new batches;

(14) combining the optimized target values of all the time intervals obtained in step (13) into a new optimized variable curve according to a time interval sequence i=1, 2, ... N;

(15) judging whether there is new data to be updated; if there are new data, going to step (10) to continue with self-learning updating operation, or else end the learning process;

controlling the batch reactor using the optimized target values of the time intervals.

2. The data difference-driven self-learning dynamic batch process optimization method according to claim 1, characterized in that the time intervals of batch process data collection in step (1) are equal or not equal.

3. The data difference-driven self-learning dynamic batch process optimization method according to claim 1, characterized in that interval partitioning in step (3) is equal-interval partitioning or unequal-interval partitioning.

4. The data difference-driven self-learning dynamic batch process optimization method according to claim 1, characterized in that digital filtering is carried out on the optimized variable curve established in step (14), so that a new optimized curve is smooth and easy to track and control.

5. The method of claim 1, wherein the batch reactor is a batch rectifying tower, a batch dryer, a batch fermentation reactor, or a batch crystallization reactor.

* * * * *